US009172750B2

(12) United States Patent
Bulkowski et al.

(10) Patent No.: US 9,172,750 B2
(45) Date of Patent: Oct. 27, 2015

(54) CLUSTER-NODE LOAD BALANCING IN A DISTRIBUTED DATABASE SYSTEM

(71) Applicants: Brian J. Bulkowski, Menlo Park, CA (US); Venkatachary Srinivasan, Sunnyvale, CA (US)

(72) Inventors: Brian J. Bulkowski, Menlo Park, CA (US); Venkatachary Srinivasan, Sunnyvale, CA (US)

( * ) Notice: Subject to any disclaimer, the term of this patent is extended or adjusted under 35 U.S.C. 154(b) by 0 days.

(21) Appl. No.: 14/511,141

(22) Filed: Oct. 9, 2014

(65) Prior Publication Data

US 2015/0127625 A1    May 7, 2015

Related U.S. Application Data

(63) Continuation-in-part of application No. 14/299,566, filed on Jun. 9, 2014, now Pat. No. 9,002,871, which is a continuation-in-part of application No. 13/451,551, filed on Apr. 20, 2012, now Pat. No. 8,799,248.

(60) Provisional application No. 61/478,940, filed on Apr. 26, 2011.

(51) Int. Cl.
*G06F 17/30* (2006.01)
*H04L 29/08* (2006.01)

(52) U.S. Cl.
CPC .......... *H04L 67/10* (2013.01); *G06F 17/30545* (2013.01); *G06F 17/30575* (2013.01); *G06F 17/30598* (2013.01)

(58) Field of Classification Search
CPC ................... G06F 17/30575; G06F 17/30598; G06F 17/30634; G06F 17/30657
See application file for complete search history.

(56) References Cited

U.S. PATENT DOCUMENTS

| | | | | |
|---|---|---|---|---|
| 6,014,669 A * | 1/2000 | Slaughter et al. | ............. | 707/610 |
| 7,461,130 B1 * | 12/2008 | AbdelAziz et al. | ........... | 709/208 |
| 7,644,087 B2 * | 1/2010 | Barkai et al. | .................. | 707/770 |
| 7,783,610 B2 * | 8/2010 | Lin et al. | ....................... | 707/689 |
| 7,933,882 B2 * | 4/2011 | Wilding et al. | ............... | 707/704 |
| 7,937,377 B2 * | 5/2011 | Wilding et al. | ............... | 707/704 |
| 7,970,797 B2 * | 6/2011 | Wilding et al. | ............... | 707/802 |
| 8,799,248 B2 * | 8/2014 | Bulkowski et al. | ........... | 707/703 |
| 9,002,871 B2 * | 4/2015 | Bulkowski et al. | ........... | 707/763 |

OTHER PUBLICATIONS

Jing Han, Meina Song, and Junde Song, "A Novel Solution of Distributed Memory NoSQL Database for Cloud Computing", Computer and Information Science (ICIS), 2011 IEEE/ACIS 10th International Conference.*

* cited by examiner

*Primary Examiner* — Cheryl Lewis

(57) ABSTRACT

In one exemplary aspect, a method of a cluster-node load balancing system of a distributed database system includes receiving a request from a cluster with at least one node of a cluster of the distributed database system. The request includes a query for an identity of all other nodes known by the node as well as a metadata of all data maintained by the node. The identity of all other nodes known by the node as well as the metadata of all data maintained by the node is provided to the cluster.

16 Claims, 7 Drawing Sheets

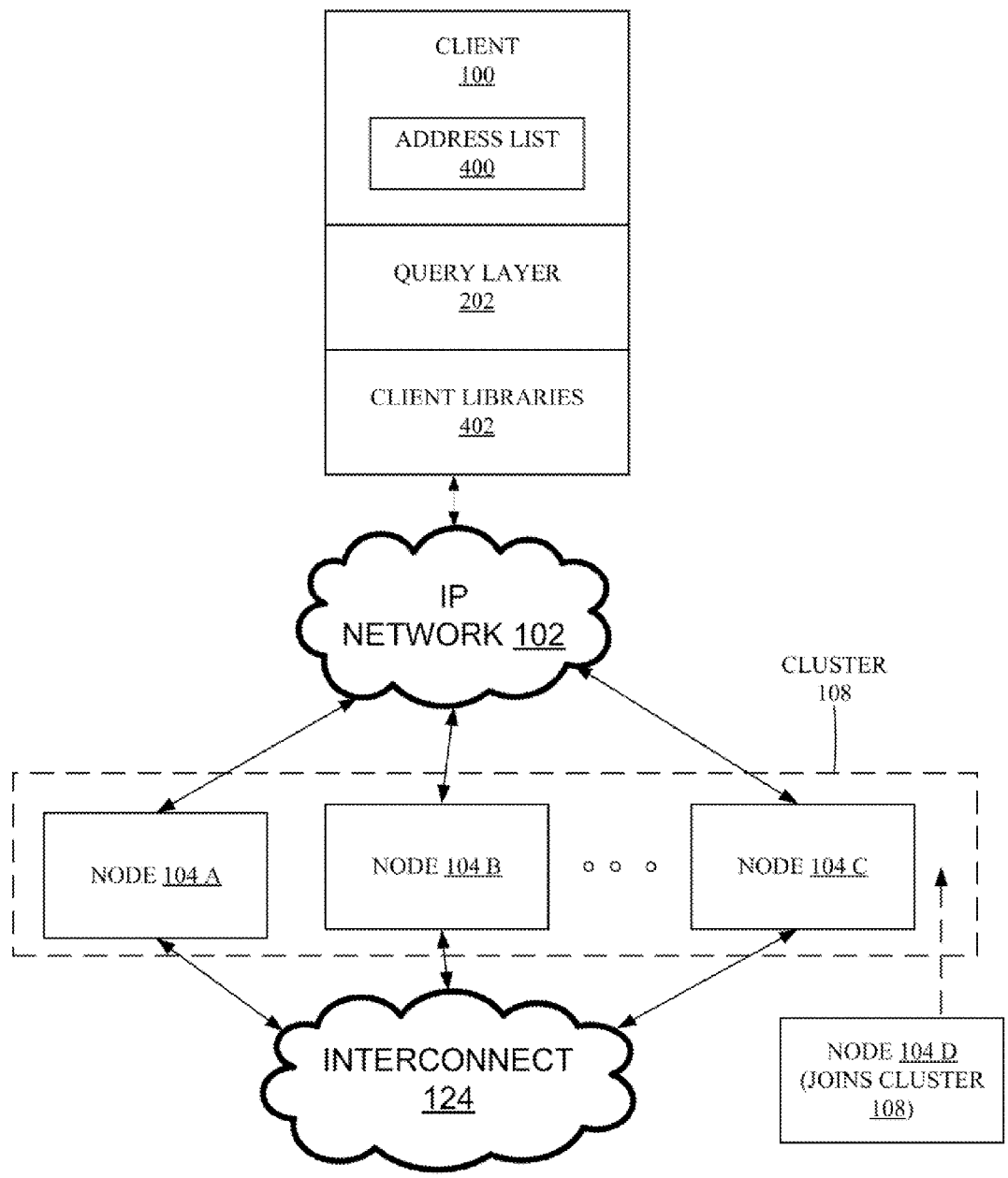

CLUSTER-NODE LOAD BALANCING IN A DISTRIBUTED DATABASE SYSTEM

CROSS-REFERENCE TO RELATED APPLICATIONS

This application incorporates by reference the following U.S. patent applications: U.S. patent application Ser. No. 14/299,566, titled METHOD AND SYSTEM OF MAPREDUCE IMPLEMENTATIONS ON INDEXED DATASETS IN A DISTRIBUTED DATABASE ENVIRONMENT and filed on Jun. 9, 2014 U.S. Pat. No. 9,002,871; U.S. patent application Ser. No. 13/653,411, titled METHOD AND SYSTEM OF MAPREDUCE IMPLEMENTATIONS ON INDEXED filed on Oct. 17, 2012 U.S. Pat. No. 8,775,464; U.S. application Ser. No. 13/451,551, titled REAL-TIME TRANSACTION SCHEDULING IN A DISTRIBUTED DATABASE and filed Apr. 20, 2012 U.S. Pat. No. 8,799,248; and U.S. Provisional Application No. 61/478,940, titled DISTRIBUTED DATABASE SYSTEM WITH A CLUSTER OF AUTONOMOUS NODES and filed Apr. 26, 2011. These applications are hereby incorporated by reference in their entirety.

BACKGROUND

1. Field

This application relates generally to data storage, and more specifically to a system, article of manufacture and method of cluster-node load balancing in a distributed database system.

2. Related Art

A distributed database can include a plurality of database nodes and associated data storage devices. A database node can manage a data storage device. If the database node goes offline, access to the data storage device can also go offline. Accordingly, redundancy of data can be maintained. However, maintaining data redundancy can have overhead costs and slow the speed of the database system. Additionally, offline data may need to be rebuilt (e.g. after the failure of the database node and subsequent rebalancing operations). This process can also incur a time and processing cost for the database system. Therefore, methods and systems of self-managing nodes of a distributed database cluster with a consensus algorithms can provide improvements to the management of distributed databases.

BRIEF SUMMARY OF THE INVENTION

In one aspect, a method of a cluster load balancing system of a distributed database system includes receiving a request from a cluster with at least one node of a cluster of the distributed database system. The request includes a query for an identity of all other nodes known by the node as well as a metadata of all data maintained by the node. The identity of all other nodes known by the node as well as the metadata of all data maintained by the node is provided to the cluster.

In another aspect, a method of a distributed database system includes providing a first server node of a node cluster of a Not Only SQL (NoSQL) distributed database system. The first server node maintains a node address list of a set of active cluster nodes of the node cluster. A second cluster node of the node cluster of the NoSQL distributed database system is provided. Upon joining the node cluster, the second cluster node is configured with an address of the first server node. The second cluster node requests the node address list from the first server node. The second cluster node polls each individual node of the set of active cluster nodes to determine the portions of the data of the NoSQL distributed database system that each individual node maintains.

Optionally, the first server node and the second cluster node communicate using an ASCII-based control protocol. The first server node communicates the node address list to the second cluster list after the second cluster node requests the node address list from the first server node. The node address list comprises an identity the set of active cluster nodes of the node cluster and a metadata of all data maintained by the first node. Each individual node responds to the second node with the metadata comprising a distributed hash table comprising the data maintained by each individual node. The node cluster is designed without a node master and without database sharding. The second node creates a data map of set of active cluster nodes of the node cluster, and wherein the data map is used to populate the node address list in the second node.

BRIEF DESCRIPTION OF THE DRAWINGS

The present application can be best understood by reference to the following description taken in conjunction with the accompanying figures, in which like parts may be referred to by like numerals.

Figure 1:
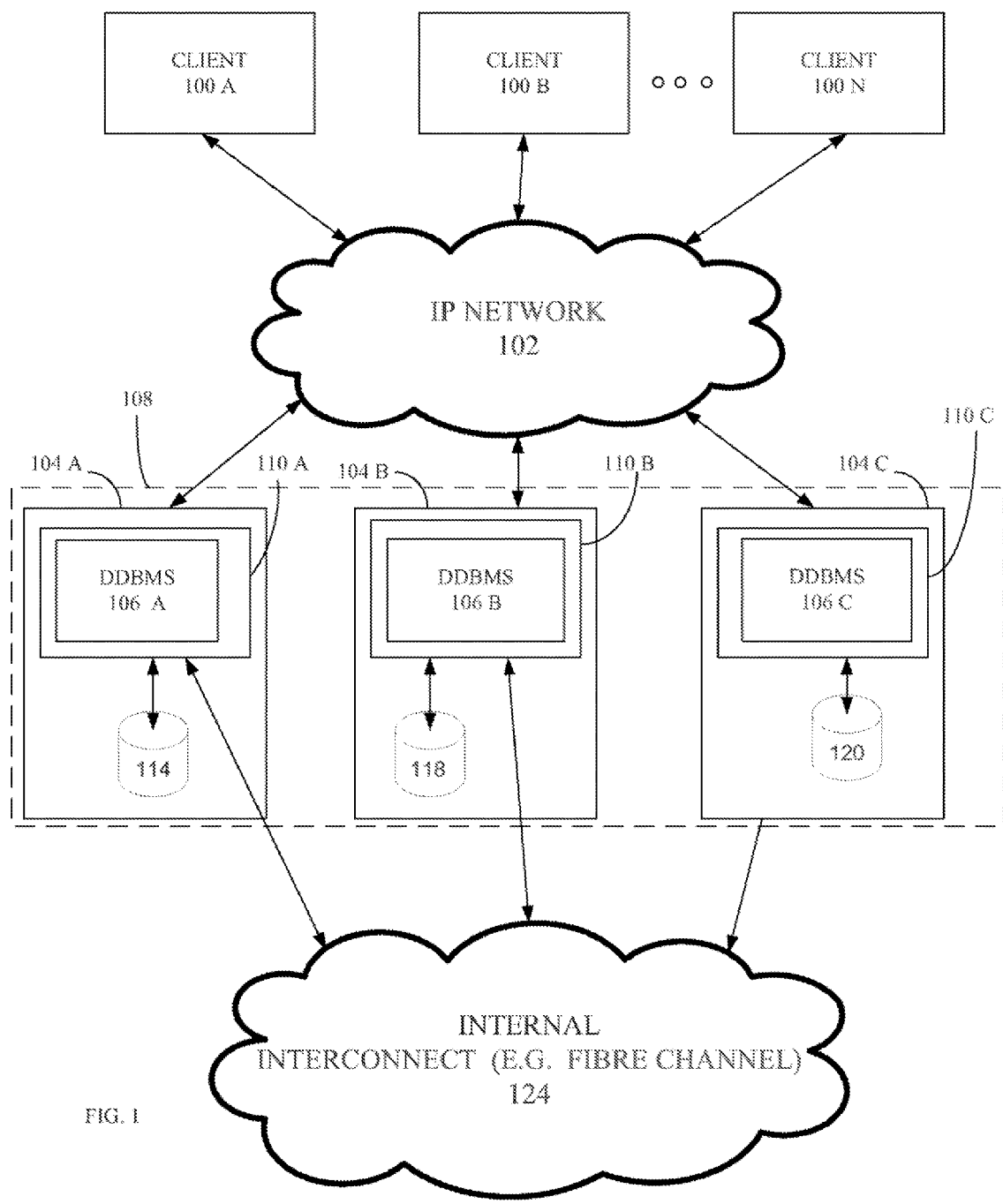
FIG. 1 shows, in a block diagram format, a distributed database system operating in a computer network according to an example embodiment, according to some embodiments.

The Figures described above are a representative set, and are not an exhaustive with respect to embodying the invention.

DETAILED DESCRIPTION

Disclosed are a system, method, and article of manufacture for cluster-node load balancing in a distributed database system. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A. Environment and Architecture

Disclosed are a system, method, and article of manufacture of a distributed database system. FIG. 1 shows, in a block diagram format, a distributed database system (DDBS) operating in a computer network according to an example embodiment, according to some embodiments. A DDBS can typically be a collection of databases that can be stored at different computer network sites. Each database may involve different database management systems and different architectures that distribute the execution of transactions. A DDBS can be managed in such a way that it appears to the user as a centralized database.

FIG. 1 shows database nodes 104 A-C (hereafter 'nodes') that collectively represent a cluster of computers 108 and associated databases (hereafter 'cluster') usable by a DDBS. The processing and data storage of the DDBS can be partitioned into nodes 104 A-C. The term "cluster" refers to a collection of one or more networked database nodes that function as a single system. In one example embodiment, cluster 108 can be designed without a node master and without database sharding. Database sharding typically involves a method of horizontal partitioning in a database or search engine. The architecture of cluster 108 can establish node equality and use uniform data distribution across cluster 108. Cluster 108 can also utilize a per node structure in order to provide continuity of processing cluster data transactions in the event of a single point of failure within the cluster. Additionally, cluster 108 can use a data rebalancing mechanism that can evenly distribute query volume across all nodes in a manner that rebalancing does not generally affect the behavior of cluster 108. Cluster 108 can also automatically handle network-partitioning events. These operations are discussed in further detail below.

In a particular example embodiment, cluster 108 can be implemented with a shared-nothing architecture. A shared-nothing architecture is typically characterized by data partitioning and no sharing between the machine components in a cluster of computers, except where communication between partitions is carried out. The database task carried out by the cluster is subdivided and each machine carries out processing steps using its own resources to complete its subdivided portion or portions of the task. Such a cluster architecture can scale for database workloads and have a limited need for intra-cluster communication.

Nodes 104 A-C can communicate to clients 100 A-N via IP network 102. Internet-protocol (IP) network 102 can utilize a set of communications protocols used for the Internet and other similar networks. In some embodiments, IP network 102 may also include other means of data communication such as a local area network (LAN) that utilizes IEEE 802-type protocols, a telecommunications data network, or any combination thereof. Clients 100 A-N can be any application or process that communicates with nodes 104 A-C via IP network 102.

Nodes 104 A-C can include one or more central processing units (CPU), memory resources and permanent data storage systems. Database nodes 104 A-C can include distributed database management system (DDBMS) 106 A-C. DDBMS 106 A-C can include a set of computer programs that controls the creation, maintenance, and the use of distributed database of cluster 108. DDBMS 106 A-C manages the various data storage systems 114, 118 and 120 that comprise the distributed database as well as the data objects on the data storage systems. The particular example embodiment of FIG. 1 shows DDBMS 106 A-C as a distributed database manager layer. The DDBMS 106 A-C can include components that are able to execute database tasks on their respective servers 110 A-C, as well as to carry out functions (described below) that relate to the operation of the DDBS in cluster 108.

At the application layer of the database nodes 104 A-C can manage the processing of data transactions. For the sake of simplicity, not all the components of nodes 104 A-C are shown. However, it will be appreciated that nodes 104 A-C can include other components. For example, DDBMS 106 A-C can include systems as lock managers, schedulers, metadata managers, policy managers and the like. In some embodiments, nodes 104 A-C can be self-managing nodes that can reconfigure the cluster and repartition data within the cluster without a central administrative entity such as a database administrator (DBA).

Nodes 104 A-C can be linked together via an internal cluster interconnect 124 such as a Fibre Channel network. Fibre Channel protocols can use a transport protocol (similar to TCP used in IP networks) which predominantly transport small computer system interface (SCSI) commands over a Fibre Channel network. SCSI commands are typical a set of standards for physically connecting and transferring data between computers and peripheral devices. In other embodiments, internal cluster interconnect 124 can use internet small computer system interface (iSCSI) protocols as well. iSCSI can carry SCSI commands over (and thus link nodes 104 A-C via) an IP network.

A database transaction can comprise a unit of work performed within the data storage system (or similar system) against a database, and is treated in a coherent and reliable way generally discreet of other data transactions. Generally, a database transaction has four properties that lead to the consistency and reliability of a distributed database. These are Atomicity, Consistency, Isolation, and Durability.

Atomicity.

A transaction is treated as a unit of operation. For example, in the case of a crash, the system should complete the remainder of the transaction, or it will undo all the actions pertaining to this transaction. Should a transaction fail, changes that were made to the database by it are undone (i.e. rollback).

Consistency.

This property deals with maintaining consistent data in a database system. A transaction can transform the database from one consistent state to another. Consistency falls under the subject of concurrency control.

Isolation.

Each transaction should carry out its work independently of any other transaction that may occur at the same time.

Durability.

This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

Additionally, nodes 104 A-C can also include of one or more data storage devices 114, 118 and 120 (e.g. a dynamic random-access memory (DRAM), rotating hard disk, solid-state drive (SSD), or any combination thereof) or file systems. Each data storage device 114, 118 and 120 can have a set of metadata that uniquely identifies the data its stores and the data attributes (e.g. time stamps and the like) to the DDBMS that manages the particular storage device.

An SSD device can be a data storage device that uses solid-state memory to store persistent data with the intention of providing access in the same manner of a block input/output hard disk drive. DRAM can be a type of random-access memory that stores each bit of data in a separate capacitor within an integrated circuit. The capacitor can be either charged or discharged; these two states are taken to represent the two values of a bit (0 and 1). A hard-disk drive can be a non-volatile magnetic data storage device in which data are digitally recorded by various electronic, magnetic, optical, or mechanical methods on a surface layer deposited of one or more planar, round and rotating platters.

Figure 2:
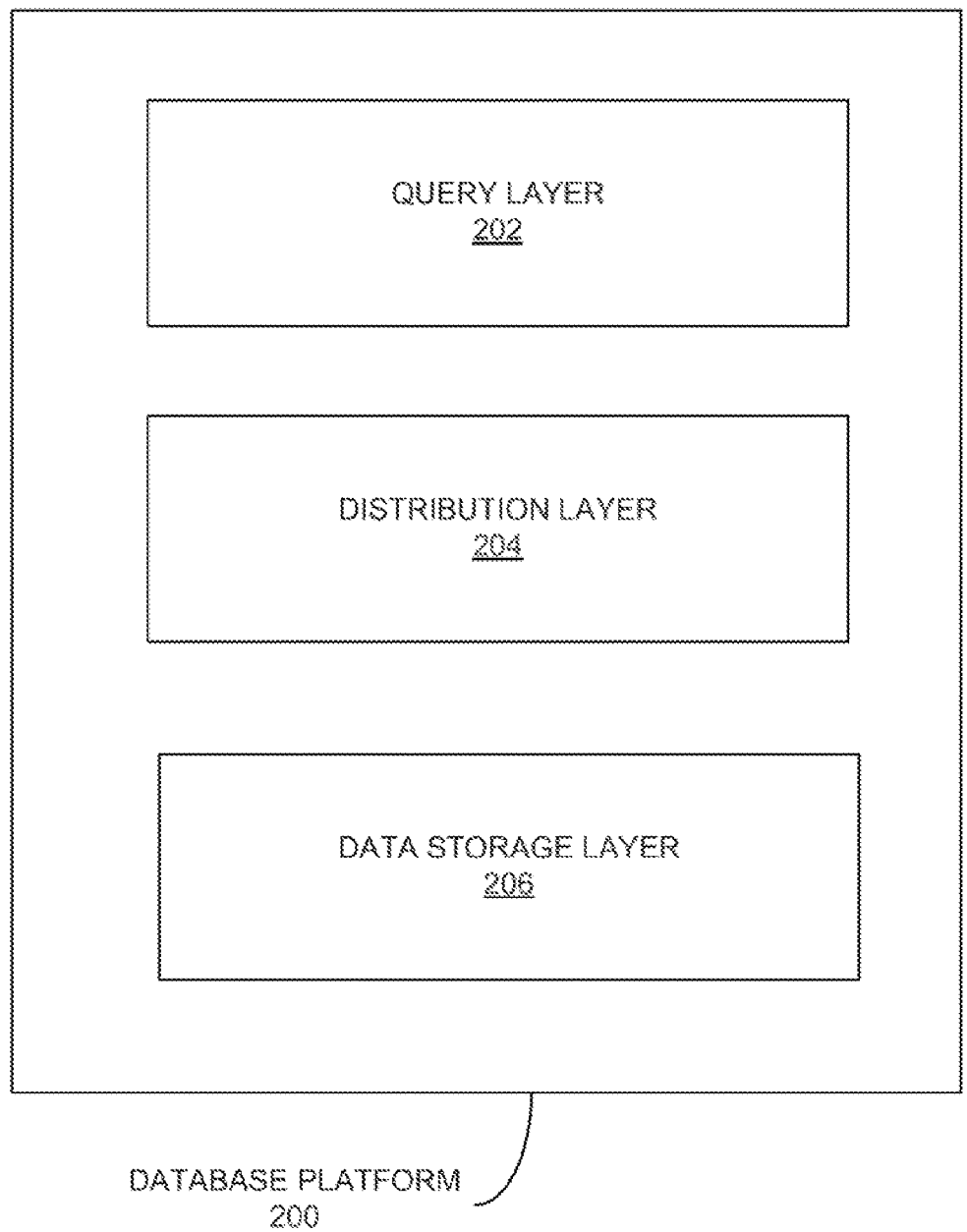
FIG. 2 depicts a block diagram of an exemplary database platform that can be implemented in a DDS such as the system of FIG. 1, according to some embodiments.

FIG. 2 depicts a block diagram of an exemplary database platform that can be implemented in a DDS such as the system of FIG. 1, according to some embodiments. Database platform 200 includes both hardware architecture and software frameworks that allow the database systems, such as the software functionalities of the query layer 202, the distribution layer 204 and the data storage layer 206, to operate.

The query layer 202 can include the client libraries and the query mechanisms. Client libraries can include smart client libraries, including libraries in the PHP, Java, C#, C, C libevent, Python and Ruby on Rails languages. Query layer 202 can include systems and functionalities that support various query types from clients 100 A-N. Query layer 202 can handle client communications in various protocol formats such as an ASCII-based control protocol. This protocol can govern the client's server discovery process and the client-server handshake. Query layer 202 can be optimized for key-value queries as well as other query types. Additional information regarding the query layer 202 is provided below in the description of FIG. 4.

Distribution layer 204 can include systems and functionalities that implement and manage a distributed node cluster architecture (such as those described above with regards to the system of FIG. 1) that can combine distributed transactions with server distribution. Distribution layer 204 can implement such operations as inter-cluster communication, cluster-consensus voting operations, namespace distribution, distributed transaction management, replication operations and maintenance operations.

Data storage layer 206 can include systems and functionalities that support a variety of data models according to the various embodiments. In one example embodiment, the data storage layer 206 can include three functional units (not shown). In this example embodiment, the data model can provide application semantics that include named columns and typed values. A primary key index can be used to perform data lookup, data retrieval and data iteration operations. The systems and functionalities of the data storage layer 206 can also utilize various data storage systems, including DRAM, rotational disk, flash storage, or any combination thereof (e.g. data on rotational disk using available DRAM as a cache). Flash storage can be implemented with an SSD device. Furthermore, in this example embodiment, the data storage layer 206 can implement a schema-free data model that supports the standard read/write operations and additionally supports the ability to increment values within the distributed database. The data storage layer 206 can additionally implement indexes that are stored in DRAM.

Data storage layer 206 can spread the contents of each namespace across every node in a cluster. This virtual partitioning can be automatic and transparent to a client. If a node receives a request for a piece of data it does not have locally, the node can then satisfy the request by creating an internal proxy for this request. The node can then fetch the data from the real owner node and then subsequently reply to the client directly. It should be noted that other aspects of database platform 200 (e.g. a data transport layer) have not been shown for the sake of simplicity.

Figure 3:
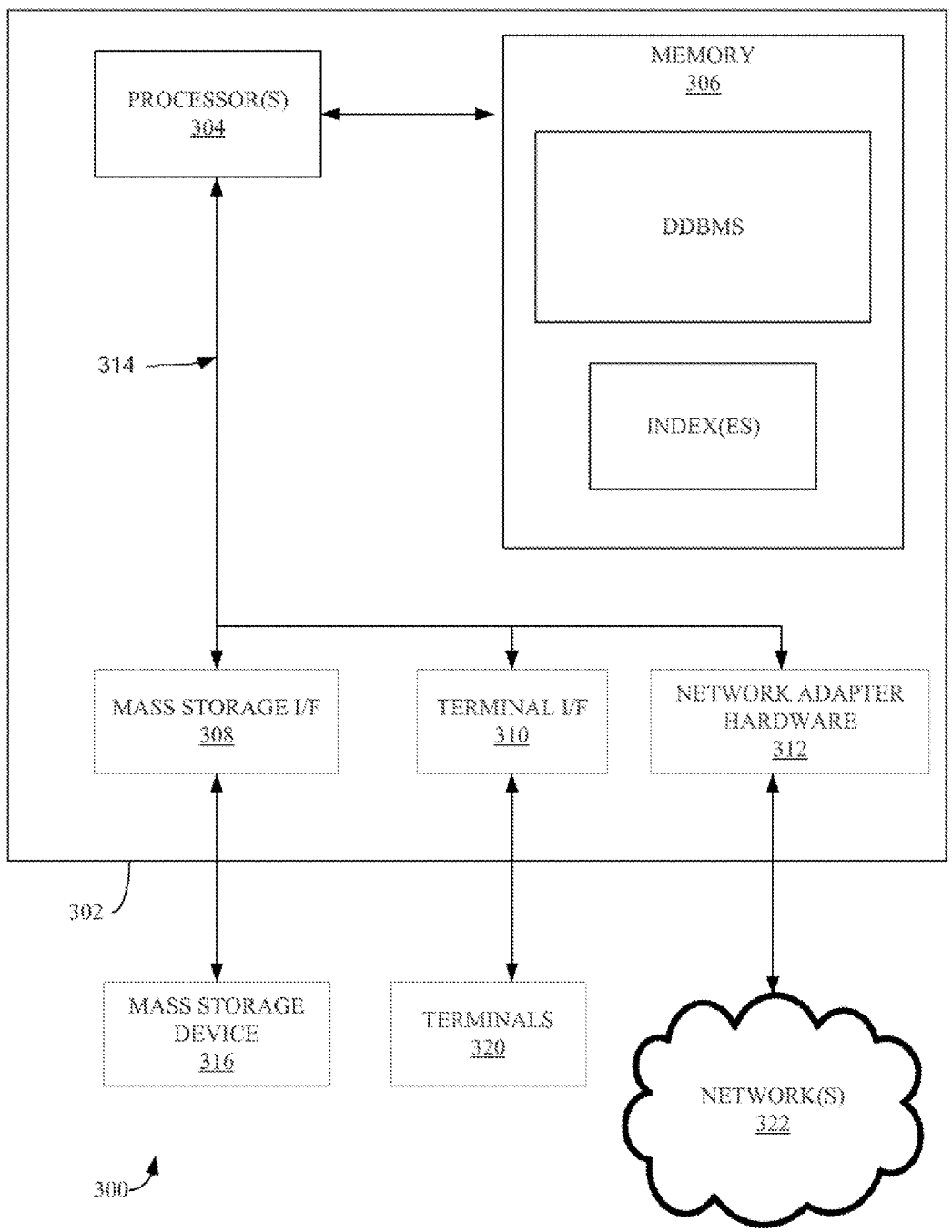
FIG. 3 depicts an exemplary computing system configured to perform any one of the processes described herein, according to some embodiments.

FIG. 3 depicts an exemplary computing system 300 configured to perform any one of the processes described herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 is a block diagram illustrating a computing system 300, according to some embodiments. The computing system 300 is based upon a suitably configured processing system adapted to implement one or more exemplary embodiments. Any suitably configured processing system can similarly be used as the computing system 300 by embodiments such as servers 110 A-C residing in cluster 108 of FIG. 1, a personal computer, workstation, a distributed database server, or the like. The computing system 300 includes a computer 302. The computer 302 has a processor(s) 304 that is connected to a memory 306, mass storage interface 308, terminal interface 310, and network adapter hardware 312. A system bus 314 interconnects these system components. The mass storage interface 308 is used to connect mass storage devices, such as data storage device 316 (e.g. data storage systems 114, 118 and 120 and data storage 708 described infra), to the computer 302. Examples of data storage 316 can include those examples discussed supra (rotating hard disk systems, SSD flash systems, DRAM, and the like), as well others such as optical drives. Data storage 316 may be used to store data to and read data from a computer-readable medium or storage product.

Memory 306, in one embodiment, includes a DDBMS, such as DDBMS 106 A-C. In some example embodiments, memory 306 can also include one or more indexes. Although illustrated as concurrently resident in the memory 306, it is clear that respective components of the memory 306 are not required to be completely resident in the memory 306 at all times or even at the same time. In one embodiment, the computer 302 utilizes conventional virtual addressing mechanisms to allow programs to behave as if they have access to a large, single storage entity, referred to herein as a computer system memory, instead of access to multiple, smaller storage entities such as the memory 306 and data storage device 316. In some embodiments, additional memory devices (such as a DRAM cache) can be coupled with computer 302 as well.

Although only one CPU 304 is illustrated for computer 302, computer systems with multiple CPUs can be used equally effectively. Some embodiments can further incorporate interfaces that each includes separate, fully programmed microprocessors that are used to off-load processing from the CPU 304. Terminal interface 310 is used to directly connect one or more terminals 320 to computer 302 to provide a user interface to the computer 302. These terminals 320, which are able to be non-intelligent or fully programmable workstations, are used to allow system administrators and users to communicate with computer 302. The terminal 320 can also include other user interface and peripheral devices that are connected to computer 302 and controlled by terminal interface hardware included in the terminal I/F 310 that includes video adapters and interfaces for keyboards, pointing devices, and the like.

An operating system (not shown) included in the memory is a suitable multitasking operating system such as the Linux, UNIX, Windows XP, and Windows Server operating system. Embodiments are able to use any other suitable operating system. Some embodiments utilize architectures, such as an object oriented framework mechanism, that allows instructions of the components of operating system to be executed on any processor located within computer 302. The network adapter hardware 312 is used to provide an interface to a network 322. Some embodiments are able to be adapted to work with any data communications connections including present day analog and/or digital techniques or via a future networking mechanism.

Although the exemplary embodiments are described in the context of a fully functional computer system, those skilled in the art will appreciate that embodiments are capable of being distributed as a program product via CD or DVD, e.g., a CD ROM, or other form of recordable media, or via any type of electronic transmission mechanism. At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, and Java) or some specialized application-specific language.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

B. Operation

Figure 4A:
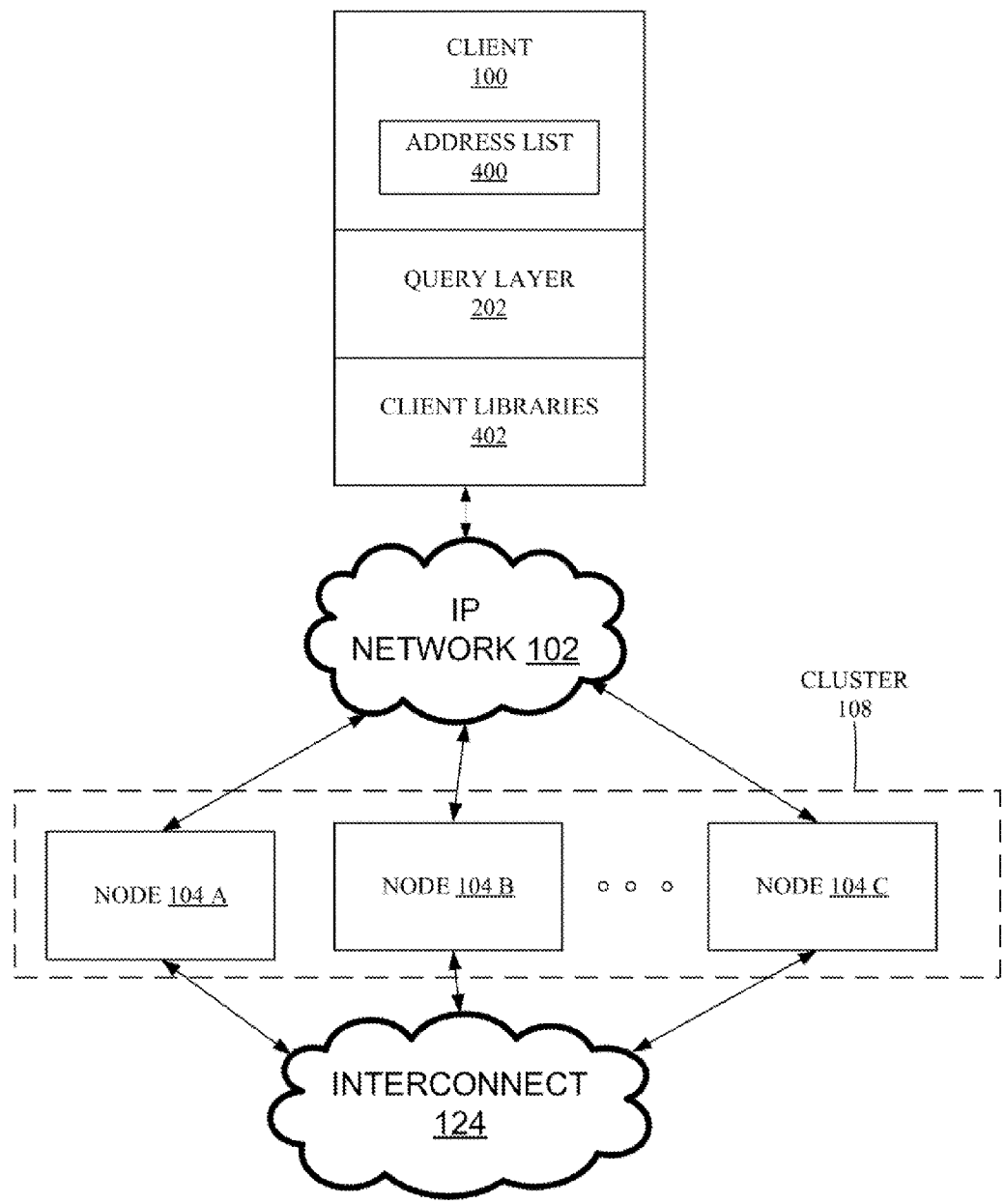
FIGS. 4 A-B depict an example cluster load balancing system of a DDBS that utilizes the query layer, according to some embodiments.

FIGS. 4 A-B depicts an example cluster load balancing system of a DDBS that utilizes the query layer 202 of FIG. 2 supra, according to some embodiments. Client 100 can communicate to nodes 104 A-C using an ASCII-based control protocol. The control protocol can govern such operations as the client's server discovery process and the client server handshake. Upon startup of cluster 108, client 100 can be configured with the address of at least one of nodes 104 A-C. Once client 100 has secured an address, client 100 can then request the addressed node for the remaining node addresses. In this way, client 100 can create a node address list 400. Address list 400 can be periodically maintained and updated. Additionally, client 100 can poll each individual node to determine the portions of the data of the DDBS that the particular node maintains. Nodes 104 A-C then respond with metadata (e.g. a distributed hash table (DHT)) about the data maintained by the particular node. Client 100 and nodes 104 A-C can use a client-side metadata-communication protocol to communicate metadata queries and responses between each other. Use of the metadata-communication protocol allows for client/server data exchanges to proceed in a substantially concurrent manner with the operations of FIGS. 4 A-B. In this way, client 100 can then create and maintain a data map of nodes 104 A-C. The data map can be used to populate address list 400 and/or client libraries 402 (see below).

Client libraries 402 can include the source code in a computer programming language such as Java, PHP, C#, C, C libevent, Python and Ruby on Rails. Client libraries 402 can include both blocking and event-oriented interfaces. Client applications can link against the Client libraries 402. In this way, client libraries 402 can expose a common set of interfaces for data insertion, retrieval, modification, and deletion. Client libraries 402 can also connect a client application to cluster 108. Client libraries 402 can implement a discovery protocol and route each query to nodes 104 A-C (or, in some cases, determine and route the query to an optimal node). Client libraries 402 can include information as to where individual data elements are stored. Client libraries 402 dynamically tracks the size and state of cluster 108, so no reconfiguration is necessary when cluster nodes are added or removed. Additionally, client libraries 402 can automatically retry transactions safely in failure cases, or if desired, can apply transactions only once. Client libraries 402 can include mechanisms for retrying writes and using a client-generated unique persistent transaction identifier.

In one example embodiment, client 100 can internally follow the cluster with the following operation. Client 100 can request that a node (such as node 104 A) generate a list of peer ('friend') nodes (e.g. 104 B and C) in cluster 108 and determine which data is maintained by each peer node. Nodes 104 A-C can communicate this information via internal interconnect 124. Thus, node 104 A would return a list of nodes 104 B and C and their respective concomitant data. This information can then be provided to client 100. Client 100 can then iterate this operation with each peer node provided in a list from node 104 (i.e. repeat the process with node 104 B and then 104 C). In this way, client 100 can discover any peer nodes that may not be known to another node. For example, a node 104 D (shown in FIG. 4B) may be included in the cluster.

Node 104 A may not be aware of this node due to some error in cluster reconfiguration. However, node 104 B may be aware of node 104 D. As a result, as client 100 iterates the operation, it will become aware of node 104 D and its concomitant data. Thus, client 100 can develop a complete list of all the nodes in cluster 108. The list can include metadata that provides the location of the data in cluster 108 as well. The list can be included in client libraries 402. The list of nodes 104 A-C and 104 D can be included in address list 400.

Figure 5:
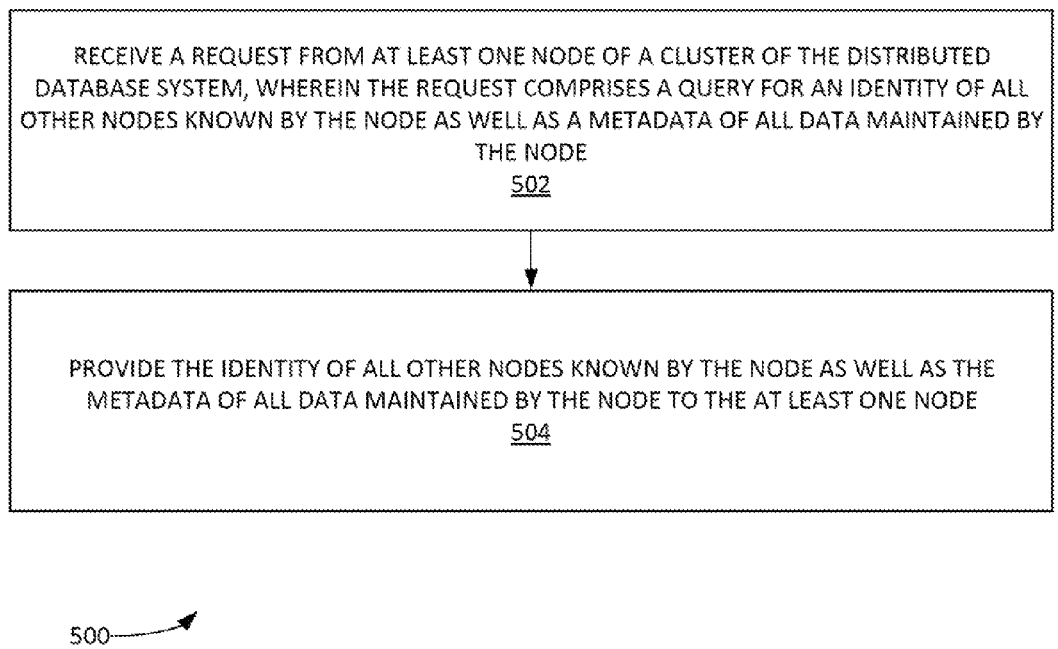
FIG. 5 depicts an example process, according to some embodiments.

FIG. 5 depicts an example process 500, according to some embodiments. Step 502 includes receiving a request from at least one node of a cluster of the distributed database system, wherein the request comprises a query for an identity of all other nodes known by the node as well as a metadata of all data maintained by the node. Step 504 includes providing the identity of all other nodes known by the node as well as the metadata of all data maintained by the node to the at least one node.

Figure 6:
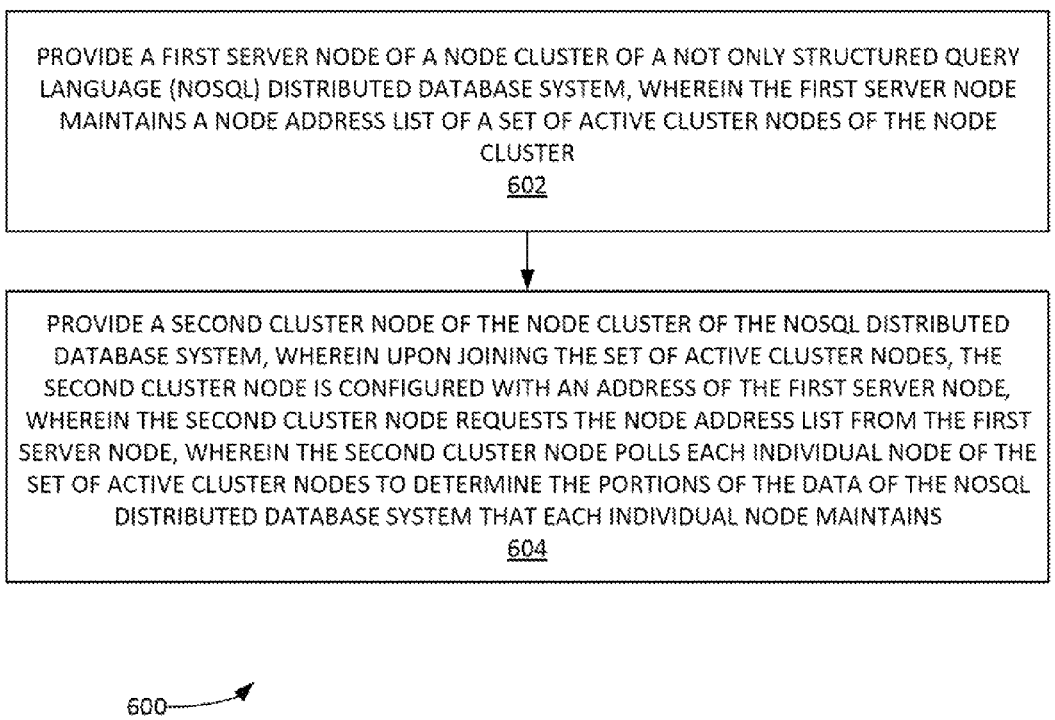
FIG. 6 illustrates an example process of a distributed database system, according to some embodiments.

FIG. 6 illustrates an example process 600 of a distributed database system according to some embodiments. Step 602 includes providing a first server node of a node cluster of a Not Only Structured Query Language (NoSQL) distributed database system, wherein the first server node maintains a node address list of a set of active cluster nodes of the node cluster. Step 604 includes providing a second cluster node of the node cluster of the NoSQL distributed database system, wherein upon joining the set of active cluster nodes, the second cluster node is configured with an address of the first server node, wherein the second cluster node requests the node address list from the first server node, wherein the second cluster node polls each individual node of the set of active cluster nodes to determine the portions of the data of the NoSQL distributed database system that each individual node maintains.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A database node of a node cluster of a distributed database system comprising:
    a query layer, implemented with at least one processor, dynamically tracking a state of the node cluster, wherein the query layer comprises a set of information of a location of individual data elements stored in the distributed database system, and wherein the query layer receives a request from a cluster node of the distributed database system and responds with the set of information of a location of individual data elements stored in the distributed database system;
    a distribution layer managing a set of distributed transactions of a distributed node cluster architecture of the distributed database in the database node; and
    a data storage layer managing data storage and data retrieval in the database node distrusted database system.

2. The node cluster of claim 1, wherein the query layer dynamically tracks the size and state of the node cluster.

3. The node cluster of claim 2, wherein a database reconfiguration operation is not performed when one or more cluster nodes added or removed to the node cluster.

4. The node cluster of claim 2, wherein the set of client libraries automatically retry transactions safely when a failure case is detected.

5. The node cluster of claim 4, wherein the set of client libraries retries a write operating using a client-generated unique persistent transaction identifier.

6. The node cluster of claim 5, wherein the query layer generates a list of peer nodes to a cluster node when the query layer receives a request from the cluster node to generate a list of peer nodes in the node cluster.

7. The node cluster of claim 6, wherein the query layer determines which data is maintained by each peer node in the node cluster.

8. The node cluster of claim 7, wherein the cluster node iteratively requests the list of peer nodes to the cluster node from the query layer of each of the other peer nodes provided in the list from query layer.

9. The node cluster of claim 8, wherein the set of information comprises a metadata that provides the location of the data in node cluster.

10. A method of a distributed database system comprising:
    providing, implemented with at least one processor, a first server node of a node cluster of a Not Only Structured Query Language (NoSQL) distributed database system, wherein the first server node maintains a node address list of a set of active cluster nodes of the node cluster;
    providing a second cluster node of the node cluster of the NoSQL distributed database system, wherein upon joining the set of active cluster nodes, the second cluster node is configured with all address of the first server node, wherein the second cluster node requests the node address list from the first server node, wherein the second cluster node polls each individual node of the set of active cluster nodes to determine the portions of the data of the NoSQL distributed database system that each individual node maintains.

11. The method of claim 10, wherein the first server node and the second cluster node communicate using an ASCII-based control protocol.

12. The method of claim 11, wherein the first server node communicates the node address list to the second cluster list after the second cluster node requests the node address list from the first server node.

13. The method of claim 12, wherein the node address list comprises an identity the set of active cluster nodes of the node cluster and a metadata of all data maintained by the first node.

14. The method of claim 13, wherein each individual node responds to the second node with the metadata comprising a distributed hash table comprising the data maintained by each individual node.

15. The method of claim 14, wherein the node cluster is designed without a node master and without database sharding.

16. The method of claim 15, wherein the second node creates a data map of set of active cluster nodes of the node cluster, and wherein the data map is used to populate the node address list in the second node.

* * * * *